US009139689B1

(12) United States Patent
Flynn et al.

(10) Patent No.: US 9,139,689 B1
(45) Date of Patent: Sep. 22, 2015

(54) BIODERIVED COMPATIBILIZER FOR BIOPOLYMERS

(71) Applicants: The United States of America, as represented by the Secretary of Agriculture, Washington, DC (US); Lapol, LLC, Santa Barbarba, CA (US)

(72) Inventors: Allison Flynn, El Cerrito, CA (US); Lennard F Torres, Pleasanton, CA (US); William J Orts, Burlingame, CA (US); Artur Klamczynski, Orinda, CA (US)

(73) Assignees: The United States of America, as represented by the Secretary of Agriculture, Washington, DC (US); Lapol, LLC, Santa Barbara, CA (US)

( * ) Notice: Subject to any disclaimer, the term of this patent is extended or adjusted under 35 U.S.C. 154(b) by 125 days.

(21) Appl. No.: 13/725,802

(22) Filed: Dec. 21, 2012

Related U.S. Application Data

(60) Provisional application No. 61/597,715, filed on Feb. 10, 2012.

(51) Int. Cl.
| | |
|---|---|
| *C08G 63/60* | (2006.01) |
| *C08L 67/00* | (2006.01) |
| *C08G 63/66* | (2006.01) |
| *C08G 63/52* | (2006.01) |
| *C08L 67/04* | (2006.01) |
| *C08L 91/00* | (2006.01) |

(52) U.S. Cl.
CPC ............... *C08G 63/60* (2013.01); *C08G 63/52* (2013.01); *C08G 63/66* (2013.01); *C08L 67/00* (2013.01); *C08L 67/04* (2013.01); *C08L 91/005* (2013.01)

(58) Field of Classification Search
CPC ........ C08G 63/52; C08G 63/60; C08G 63/66; C08L 67/00; C08L 67/04; C08L 91/005
USPC ......... 525/410, 411, 415, 450, 437, 447, 448; 528/272, 361, 302, 303, 304, 306, 308
See application file for complete search history.

(56) References Cited

U.S. PATENT DOCUMENTS 7,842,761 B2 * 11/2010 Flynn et al. ............... 525/450

* cited by examiner

*Primary Examiner* — Robert Jones, Jr.
(74) *Attorney, Agent, or Firm* — John D. Fado; Howard V. Owens, Jr.

(57) ABSTRACT

A bioderived plasticizer for biopolymers includes a compatibilizing unit and a polyester plasticizing unit. The plasticizer improves the flexibility of biopolymers while not adversely affecting the modulus of the biopolymer. The compatibilizing unit renders the plasticizer more miscible with the desired base biopolymer, and may increase crystallization and includes a lower alkyl (C3 to $C_7$) organic acid including enantiomeric isomers of the base polymer. The polyester plasticizing unit is formed from monomers comprising a multifunctional alcohol and an aliphatic anhydride or its equivalent dicarboxylic acid and ester derivatives. The polyester plasticizing unit may optionally include one or more difunctional alcohols in combination with the multifunctional alcohol. The resulting bioderived plasticizer lowers glass transition temperature (Tg), can improve brittleness, may increases heat deflection temperature and improves melt viscosity.

30 Claims, 7 Drawing Sheets

BIODERIVED COMPATIBILIZER FOR BIOPOLYMERS

RELATED APPLICATIONS

This application is claims priority to U.S. Provisional Patent Application Ser. No. 61/597,715, filed Feb. 10, 2012 the contents of which are incorporated herein by reference in their entirety.

BACKGROUND OF THE INVENTION

This invention relates to bioderived plasticizers for use with biopolymers. As used herein the term "bioderived" means made from plant-made molecules that are either directly expressed from plants, such as sugars, starches or fats, or fermented from plant-made molecules, such as sugars, starches, or fats. As used herein the term "biopolymers" means polymers made from plant derived molecules.

The disclosed bioderived plasticizers act as modifiers that change the flexural properties and thermomechanical properties, such as the heat deflection temperature, of biopolymers while maintaining miscibility between the plasticizer additive and the parent biopolymer. As used herein the term plasticizer means a molecule that improves physical, mechanical or thermal properties of a polymer. In one embodiment the modifier acts as a plasticizer to improve the flexibility of the biopolymers without adversely affecting the Young's Modulus or bleeding out at high temperature or over time, such as in storage. In another embodiment the plasticizer acts to improve the heat deflection temperature of PLA. Polylactic acid (PLA) is becoming a widely used biopolymer due to its biocompatibility, biodegradability and sustainability. Polylactic acid is expected to expand its application base because (1) the raw material L-lactic acid can be inexpensively produced in a large scale by a fermentation process, (2) degradation velocity of polylactic acid is high in the compost, and (3) polylactic acid is excellent in its resistance to fungus and its ability to protect foods from odor or color contamination. Preparation of high molecular weight lactic acid polymers can be conducted by (1) ring-opening polymerization (ROP) of the dehydrated ring-formed dimer or dilactide, (2) polycondensation and manipulation of the equilibrium between lactic acid and the polylactide by removal of the reaction water using drying agents, or (3) polycondensation and linking of lactic acid prepolymers. Polylactic acid has the following general formula:

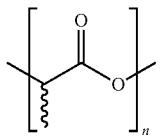

Polylactic acid is generally brittle and exhibits a low softening temperature, thus making it unsuitable for applications that require flexibility, toughness, or heat resistance such as agricultural multi-films, food packaging bags, garbage bags, hot-filled cups, microwaveable bowls and other polymeric films, foams and rigid durables. Improved rigidity improves suitability for such things as computer casings, automotive parts and secure packaging.

Generally known techniques for making polylactic acid flexible are (1) copolymerization, (2) addition of a plasticizer, and (3) blending of flexible polymers. Though these techniques generally improve the flexibility of the polylactic acid, there are problems associated with their use. Technique (1), immediately above, creates a material that generally has the properties needed for flexible films, but the production usually requires a large layout of capital which limits its use to large manufacturers of base resin. Technique (2) is used to "soften" a range of polyesters including polylactic acid or polyhydroxybutyrates (PHB), but the plasticizers tend to bleed out over time. Another issue is that techniques (1) and (2) lower the glass transition temperature of the resin composition but this also changes the physical properties such as making the material less strong as seen in a lowering of the tensile modulus.

Technique (3) above usually involves blending two polymers with desired properties such as blending a flexible non-bioderived resin with a bioderived, biodegradable resin. Examples include blends with polybutylene terephthalate-adipic acid, polybutylene succinate, polyethylene succinate, polycaprolactone with D-polylactic acid and L-polylactic acid. In some cases, additional plasticizers such as citrus esters are still used in addition to the polymeric plasticizers (U.S. Pat. No. 7,166,654). Examples of these resins have been disclosed in BASF U.S. Pat. Nos. 5,817,721, 5,889,135, and 6,018,004, Eastman Chemical U.S. Pat. Nos. 6,342,304, 6,592,913, and 6,441,126, and Japanese Patent HEI 8-245866 and HEI 9-111107, which are incorporated herein by reference.

Linear polyesters of diols and diacids have been used as plasticizers for polymers from PVC to highly crystalline polyesters of polycarbonate, polylactic acid, and other polyhydroxyalkanoates. Several of these materials have been made commercially available including BASF Ecoflex, Eastman Chemical's EastStar Bio, and Showa High Polymer Company's Bionolle U.S. Pat. No. 5,324,794. Blends made with these materials tend to have reduced modulus and they are not optically clear.

It would be an advancement in the art to provide a polymeric plasticizer that improves the flexibility of the biodegradable polymer without adversely affecting the Young's Modulus.

It would be a further advancement in the art to provide a plasticizing agent that can be blended into biodegradable polymers as well as petrochemically derived polyolefins to produce products, such as films used for garbage bags, packaging materials, injection molded parts, bottles and the like, that have excellent toughness and flexibility at low plasticizer concentrations without sacrificing physical properties such as the Young's Modulus.

It would be yet another advancement in the art to provide a polymeric plasticizer that may be blended with PLA, other polyesters such as PHAs, HIPS, ABS, polystyrene, or polyolefins such as polyethylenes, polypropylene, or copolymers of the polyethylene that shows improved compatibility and outstanding resistance to bleeding out at high temperature or over time.

It would be still another advancement in the art to provide a polymeric plasticizer that has been grafted to the backbone of polyolefins using an unsaturation functionality of the copolymer plasticizer so that the plasticizer is readily miscible with a wide range of polymers.

It would be a further advancement in the art to provide a polymeric plasticizer that can be used as a compatibilizer or an emulsifier for polyolefin/polyester blends and/or polyolefin/starch blends.

Generally known techniques for making polylactic acid more temperature tolerant are (1) induced crystallization, (2) copolymerizing with polymers with higher glass transition temperatures, and (3) blending polymer enantiomers to form stereocomplex structures with higher temperature stability. Enantiomers are molecules with identical chemical structure but different orientation around their optical centers; that is, they are non-superimposable mirror images of each other. In a preferred embodiment, technique (3) involves adding the enantiomers of 1 and d-PLA in a range of molar concentrations to improve temperature stability.

It would be an advancement in the art to provide a polymeric additive that can be used both as a compatibilizer for blends of different enantiomers of the same polymer such as the two stereospecific forms of polylactic acid, D-PLA and L-PLA and also act as modifier to improve the heat deflection temperature of PLA such that no additional steps would be needed for post production annealing

BRIEF SUMMARY OF THE INVENTION

Disclosed herein is a plasticizer composition for biopolymers made from renewable resources. The plasticizer is composed of two components. The first is a compatibilizing unit that is comprised of the same polymer as the polymer to be plasticized. The second is the plasticizing unit. The plasticizing unit is designed to change polymer properties such as flexibility, tensile strength, and thermomechanical property, specifically heat deflection. In some cases the compatibilizing unit can be used to both compatibilize and modify properties. In some cases the modifying unit enhances the modified properties.

An embodiment of the invention is the plasticizer composition containing components that allow it to be used in a compatible blend with petrochemically derived olefins. The blend includes copolymers of a compatibilizing unit and a polyester plasticizing unit which improve the flexibility of biopolymers while not adversely affecting their modulus. The melt viscosity, inducement of crystallization and improvement of physical and mechanical properties such as the heat deflection temperature of polylactic acid are also improved.

An embodiment of the invention concerns making a compatibilizing unit that is comprised of a D-lactic acid compatibilizing unit with a number average molecular weight of between 5000 and 150,000 Daltons with a polyester plasticizing unit with a number average molecular weight of between 1000 and 10,000 Daltons. The weight ratio (wt/wt) of the D-Lactic acid compatibilizer polymer to polyester plasticizing unit copolymer is between 99:1 (wt/wt) and 70:30 (wt/wt). When added to a stereo-pure L-PLA (greater than 85% and preferably greater than 95% L), in concentrations of greater than 5 wt % and more preferably between 20-40 wt %, increases the heat deflection temperature of the base polylactic acid polymer material above 100° C., the boiling point of water.

A further embodiment concerns the making of the copolymer comprising:

(a) Forming the D-lactide polymer to a predetermined molecular weight using a nucleophile initiator and then, (b) adding a premade polyester oligomer comprising a difunctional and trifunctional alcohol or other nucleophilic reagents and a diacid, triacid, aliphatic anhydride, aromatic anhydride, and/or unsaturated anhydride.

The polylactic acid unit is formed from direct ring opening polymerization of D-lactide or from condensation polymerization of D-lactic acid.

In one non-limiting embodiment, the copolymer plasticizer is blended with polylactic acid, and the blend has an increased elongation at break by at least 200% without a decrease in Young's modulus compared to the unblended polylactic acid.

In some non-limiting embodiments, the polyester plasticizing unit is formed from monomers that include at least one chain extending monomer. The chain extending monomer may be selected from, but not limited to, diglycidyl ethers and epoxidized vegetable oils of linseed, soybean, or castrol oil, and isocyanates such as MDI.

In one non-limiting embodiment, the copolymer plasticizer is blended with L-polylactic acid, and the blend has an increased heat deflection temperature of 175° C. as measured using Thermo Mechanical Analysis, TMA.

In a further embodiment, the disclosed plasticizer unit of the plasticizer formulation facilitates blends between other biopolymers, polyolefins and polyesters including other enantiomers of the base resin to be modified, further improving properties such as heat deflection temperature (HDT). HDT is the temperature at which material "softens" as defined by ASTM 648.

In another embodiment the plasticizer is blended into polylactic acid with biobased, minerals or chemical organic nucleating agents known to one of skill in the art such as talc, calcium carbonate, nanocellulose, natural rubber, torrefied biomass.

DETAILED DESCRIPTION OF THE INVENTION

Figure 1:
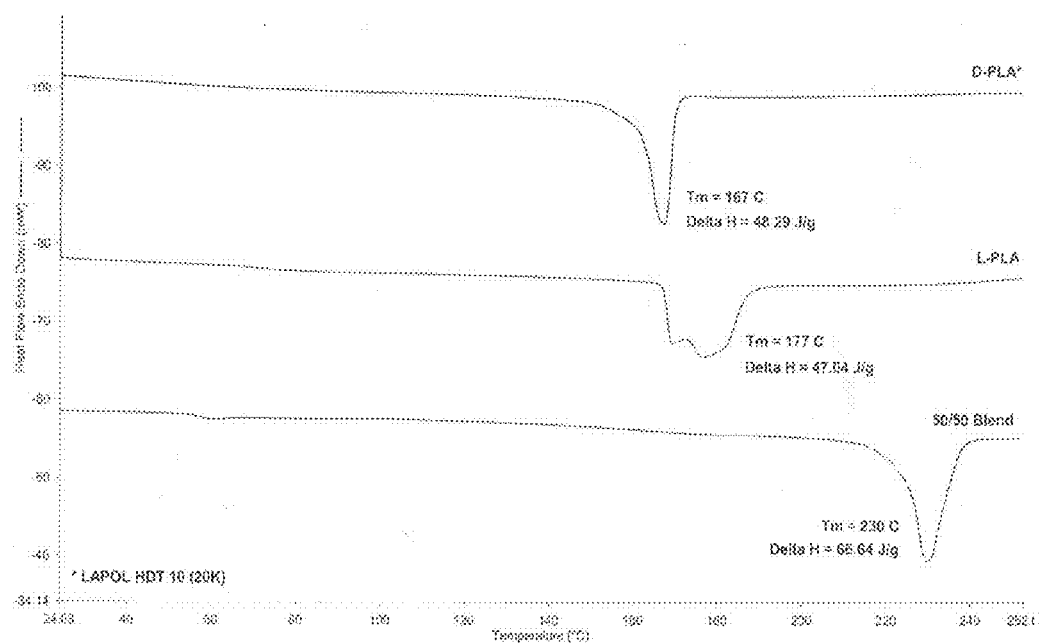
FIG. 1 is a graph comparing the melting temperatures of a Lapol HDT grade, commercially available L-PLA grade, and a 50/50 (wt/wt) blend of Lapol HDT/L-PLA. Lapol HDT and the commercially available L-PLA exhibited single melting peaks in the range of 160-180° C. Melt blending the two polymers yielded one single melting peak which is about 50° C. higher than either Lapol HDT or L-PLA.
Figure 2:
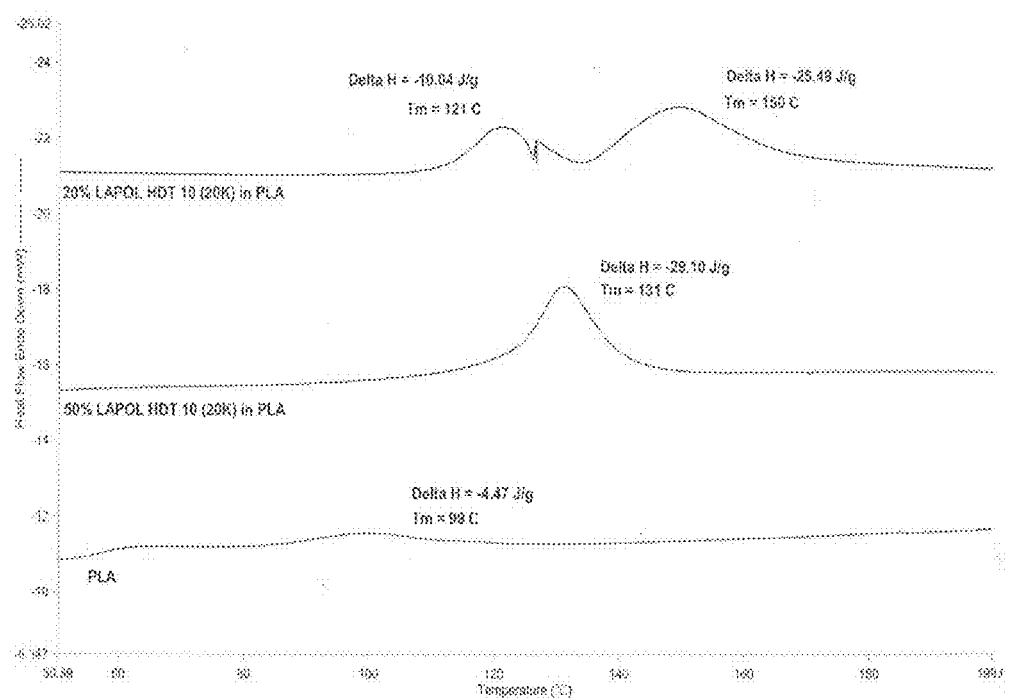
FIG. 2 is a graph of the non-isothermal crystallization of Lapol HDT of different concentrations in commercial grade L-PLA.
Figure 3:
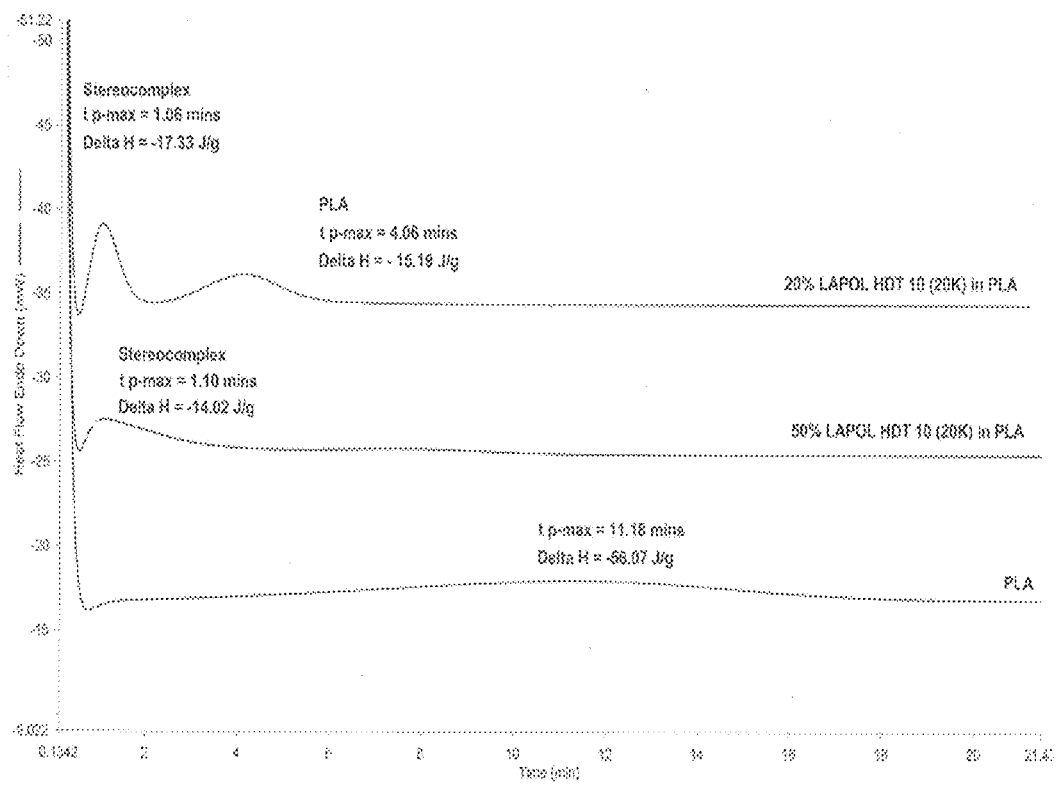
FIG. 3 is a graph of the isothermal crystallization studies of commercial grade L-PLA, 20 wt % Lapol HDT in L-PLA, and a 50/50 (wt/wt) blend of Lapol HDT/L-PLA. The crystallization half-times (t p-max in the figure) corresponds to the amount of time needed for the blend or polymer to reach a relative crystallization of about 50%. the polymer samples were directly heated to 250° C., quenched to 115° C. and the crystallization at 115° C. was monitored by DSC. Peak heights B of the crystallization peaks, likely corresponding to the growth of the homopolymer crystals, decreased in the presence of the stereocomplex crystallites. Peak heights A likely correspond to the growth of the stereocomplex crystals.
Figure 4:
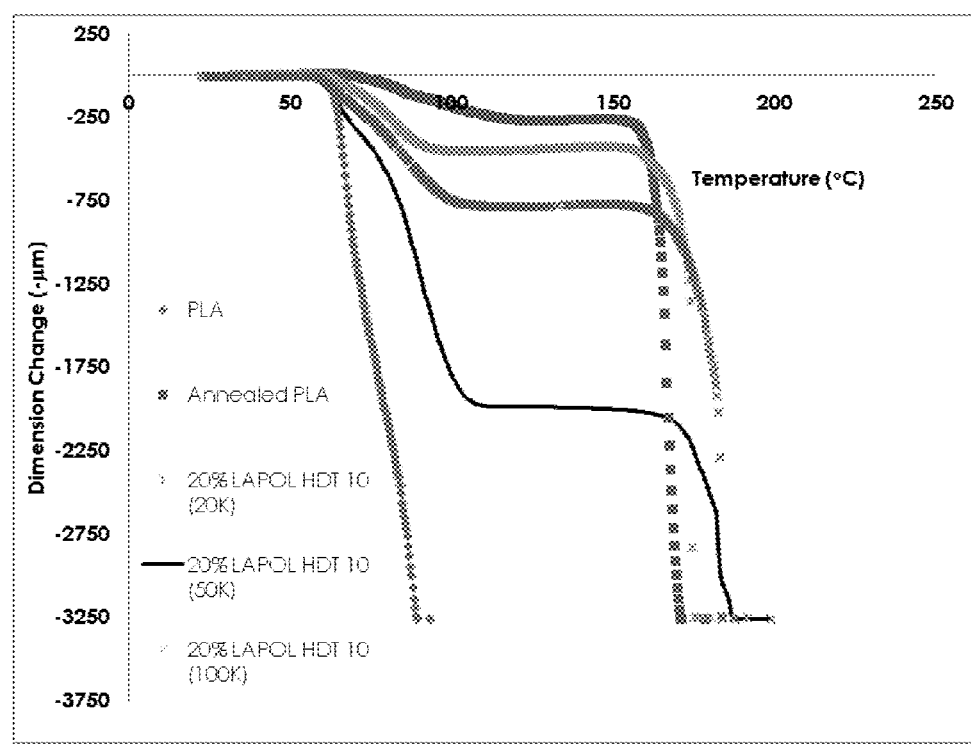
FIG. 4 is a graph of the improvements in the thermomechanical analysis (TMA) observed when Lapol HDT is blended with L-PLA.
Figure 5:
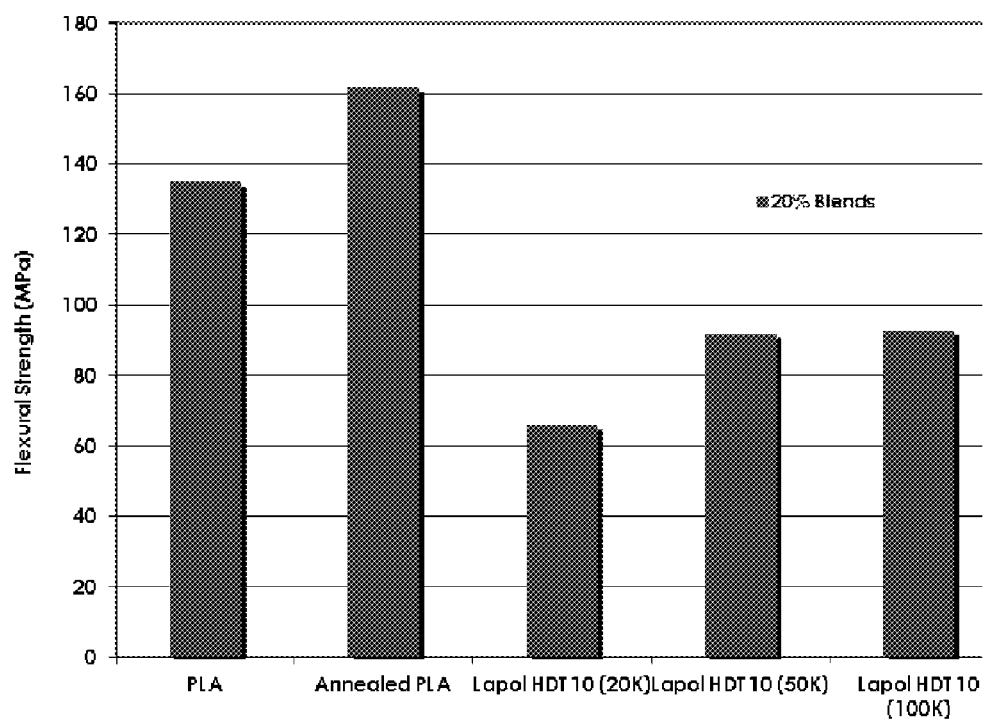
FIG. 5 is a graph of the effects of Lapol HDT on flexural strength of commercially available L-PLA.
Figure 6:
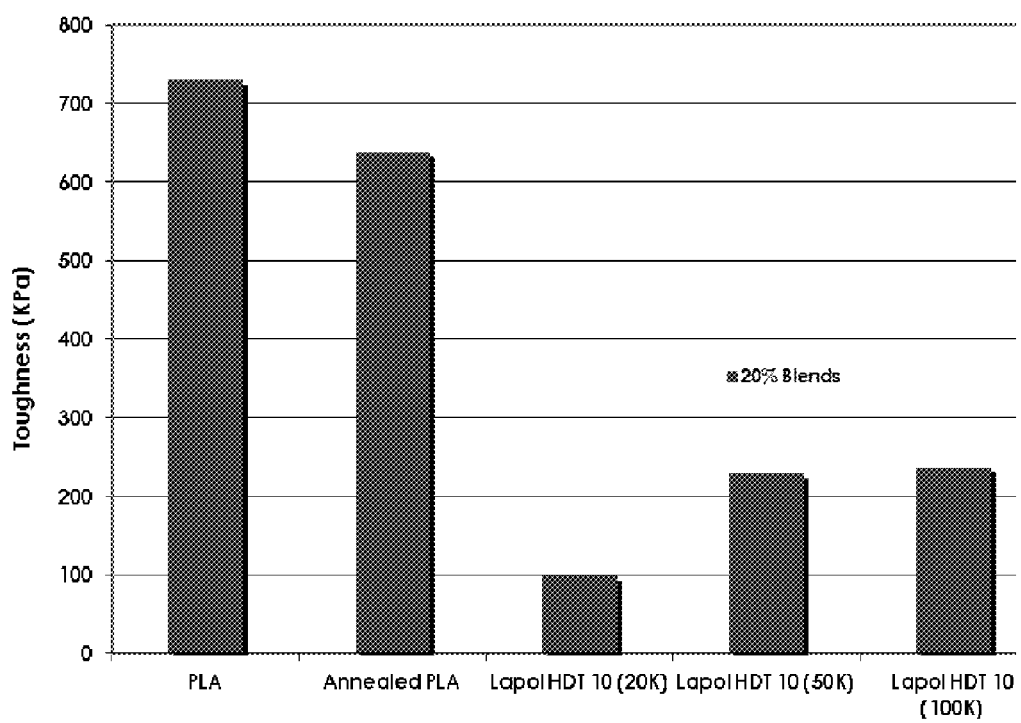
FIG. 6 is a graph of the effects of Lapol HDT on toughness of commercially available L-PLA.
Figure 7:
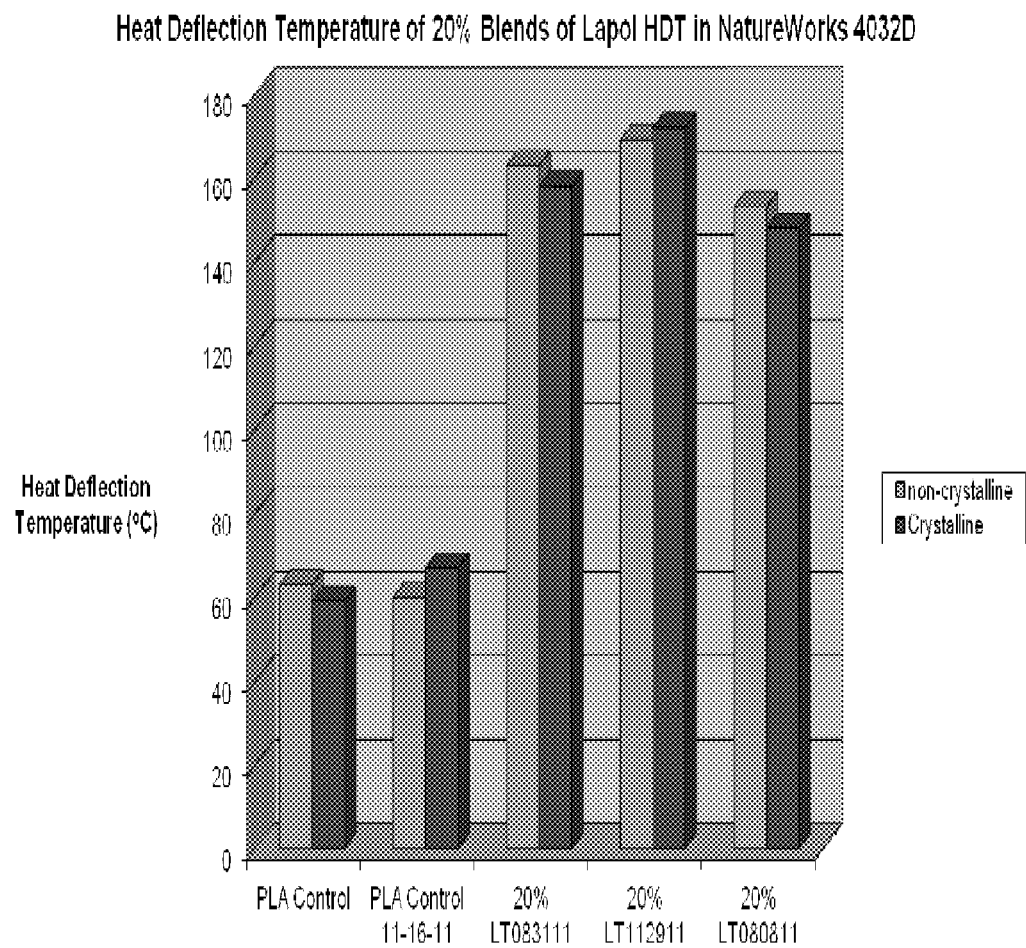
FIG. 7 is a graph of heat deflection temperature of 20% blends of Lapol HDT in NatureWorks 4032D.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of alcohols, aromatic and aliphatic anhydrides and equivalents thereof, lower alkyl organic acids, and so forth. One skilled in the relevant art will recognize, however, that the invention may be practiced without one or more of the specific details or method steps, or with other methods, components, materials, and so forth. In other instances, well-known structures, materials, or operations are not shown or described in detail to avoid obscuring aspects of the invention.

"Multifunctional alcohol" is defined to mean an alkanol comprising three or more hydroxyl groups. A multifunctional alcohol will typically be based on a C3 to C10 alkanol. A multifunctional alcohol includes, but is not limited to, triols, tetraols, etc. Difunctional alcohol or diol is defined to mean an alkanol comprising two hydroxyl groups. A difunctional alcohol will typically be based on a C2 to C10 alkanol.

As used herein, the term "PLA" unless otherwise specified, refers to both D and L stereospecific forms of polylactic acid.

"Compatibilizing unit" is a lower alkyl organic acid selected to form a more miscible blend with a desired base biopolymer or polymer. As one non-limiting example, if the base biopolymer is polylactic acid, then the compatibilizing unit is selected to be lactic acid.

The plasticizing unit is a polyester of a multifunctional alcohol, a saturated or unsaturated aliphatic anhydride or its equivalent, and a saturated aromatic anhydride or its equivalent. An "equivalent" of an aliphatic anhydride includes its dicarboxylic acid and ester derivatives. An "equivalent" of an aromatic anhydride includes its dicarboxylic acid and ester derivatives. The plasticizing unit may optionally contain a difunctional alcohol in addition to the multifunctional alcohol.

As used herein, a saturated aromatic molecule means an organic molecule that possesses a benzene ring on its backbone without additional double or triple bonds on its aliphatic chain.

As used herein, an unsaturated aliphatic molecule means an organic molecule that possesses no benzene rings but does possess unsaturated bonds (double or triple bonds) on its backbone. The degree of unsaturation is generally between 0 and 50 mole %. When the aliphatic anhydride comprises unsaturated bonds, it may function as a grafting agent when blending with polyolefins such as polystyrene, polypropylene, polyethylene, and ethylene-octene copolymers.

As used herein, the term "amorphous" means having little or no crystallinity which means that the polymer chains are arranged with little or no order. Some small amount of crystallinity may be acceptable. Crystallinity may be measured by Dynamic Scanning calorimetry (DSC), Dynamic Mechanical Thermal Analysis (DMTA) or X-ray Diffraction.

As used herein, reference to "Lapol HDT", means a composition comprising a copolymer of polylactide or polylactic acid comprising 1)D-PLA compatibilizing unit with a molecular weight range of 5,000-150,000 and 2) a plasticizer unit with a molecular weight range of 1,000-2,000 Daltons.

Herein is described a plasticizer composition that may be used with biopolymers made from renewable resources as a copolymer of polylactide to improve the heat resistance property of L-PLA without the need for post process heat treatment or annealing of the final product. The biopolymers may include, but are not limited to, starch, and other polysaccharides such as cellulose and methylcellulose, polylactic acid (PLA) and polyhydroxyalkanoates (PHA), such as, polyhydroxybutyrate (PHB), polyhydroxyvalerate (PHV), polyhydroxyhexanoate (PHH), polyhydroxyoctanoate (PHO) and copolymers thereof. The plasticizer may also contain elements that allow it to be used in a compatible blend with petrochemically derived polyolefins or other biopolymers. The plasticizer composition includes copolymers of a compatibilizing unit and a polyester plasticizing unit. Advantageously, the plasticizer unit improves the heat deflection temperature of biopolymers, when the biopolymer is PLA. Additionally, by adjusting the weight ratio range of the polyester plasticizing unit to the compatibilizing unit from 1:99 to 30:70 and procedurally growing the compatibilizing unit to a target molecular weight (MW) with subsequent addition of the polyester plasticizing unit, the heat deflection temperature of the resulting biopolymer is increased from approximately 60° C. to 160° C. with no additional post-crystallization required. When the biopolymer portion of the invention is D-PLA, the bioderived plasticizer forms a stereocomplex with the commercially available L-PLA to increase the melting temperature by as much as 50° C., while the copolyester portion of the molecule lowers the glass transition temperature in the polymer blend and helps to inhibit embrittlement. This plasticization effect allows molecular movement between polymer chains and, in the case of PLA stereomixes, enhances crystallization during processing, eliminating the need for post processing annealing of parts. An additional advantage is that the melt viscosity of highly crystalline biopolymers is increased during melt processing, therefore allowing biopolymers such as PLA to be processed at 20-30° C., above its melting temperature, enabling utility in applications such as paper coatings, hot-fill bottles, fiber formation, lids, foams, blow molding processes and rigid parts, including computer casings and non-consumables.

The compatibilizing unit is selected to form a more miscible blend with a desired base biopolymer with which the plasticizer composition will be used. The compatibilizing unit comprises a lower alkyl organic acid. In some embodiments, the lower alkyl organic acid comprises a C3 to C7 alkyl backbone. Some examples of the organic acid include, but are not limited to, lactide, lactic acid, butyric, valeric, and caprolactic acid. The lower alkyl organic acid may optionally comprise a hydroxyl moiety. In the case where the base polymer is PLA, the compatibilizing unit may comprise lactic acid, D-lactide, L-lactide or other cyclic dimers of hydroxy acids.

In one non-limiting embodiment the compatibilizing unit is the enantiomeric opposite of the base polymer such that in addition to functioning as a miscible compatibilizer, the compatibilizing unit acts as a crystallizing agent.

The polyester plasticizing unit is formed from monomers comprising a multifunctional alcohol, a saturated or an unsaturated aliphatic anhydride or its equivalent, and optionally, a saturated aromatic anhydride or its equivalent. The anhydride "equivalent" includes its dicarboxylic acid and ester derivatives. The multifunctional alcohol may be selected from, but is not limited to, glycerin, trimethyl propanol, trimethoxypropane, trimethoxyethane, pentaerythritol, cyclohexanemethanediol, polyester oligomers of pentaerythritol, and mixtures thereof. The aliphatic anhydride or its equivalent may be selected from, but is not limited to, maleic anhydride, itaconic anhydride, fumaric acid, diacids of unsaturated fatty acids, and mixtures thereof. The saturated aromatic anhydride or its equivalent may be selected from, but is not limited to, phthalic anhydride, terephthalic acid, isophthalic acid, and mixtures thereof.

The polyester plasticizing unit preferably has a molar ratio of the aliphatic anhydride or its equivalent to the aromatic anhydride or its equivalent in the range from 99:1 to 1:99. In some embodiments, the plasticizing unit has a molar ratio of the aliphatic anhydride or its equivalent to the aromatic anhydride or its equivalent in the range from 50:50 to 90:10. In other embodiments, the plasticizing unit has a molar ratio of the aliphatic anhydride or its equivalent to the aromatic anhydride or its equivalent in the range from 40:60 to 60:40.

The polyester plasticizing unit may optionally include one or more difunctional alcohols in combination with the multifunctional alcohol. In some non-limiting embodiments, the molar ratio of difunctional alcohols to multifunctional alcohols is from 5:95 to 95:5. The difunctional alcohol preferably has a carbon number in the range from 2 to 10. The difunctional alcohol may be selected from, but is not limited to dianhydro-D-glucitol, 1,2 propanediol, 1,3 propanediol, ethylene glycol, diethylene glycol, neopentyl glycol, dipropylene glycol, dibromoneopentyl glycol, propoxylated bispheno-A, ethoxylated bisphenol A, 2,2,4-trimethylpentane-1,3-diol, tetrabromobisphenol dipropoxy ether, triethylene glycol, tetraethylene glycol, 1,4-butanediol, 1,3-butanediol, 1,5pentanediol, 1,6 hexanediol, 1,7heptanediol, octanediol, cyclopentadiol, cyclohexanediol, cyclohexanedimethanol, and derivatives and mixtures thereof. Other nonlimiting examples of the difunctional alcohol include oligomeric dialcohol terminated polyethers such as polyethyelene glycol and polytetrahydrofuran.

The plasticizer composition preferably has a weight ratio (wt/wt) of the compatibilizing unit to the polyester plasticizing unit in the range from 99:1 (wt/wt) to 70:30 (wt/wt), preferably from 90:10 (wt/wt) to 70:30 (wt/wt). The resulting copolymer plasticizer is preferably fabricated under conditions that produce a weight average molecular weight between about 1000 and 90,000 g/mol. The copolymer plasticizer may have a glass transition temperature (Tg) from below −20° C. to 70° C.

The lactic acid used to form the compatibilizing unit of the plasticizer can be any of the isomers or stereopure isomers of lactic acid, L-, D-, or meso-PLA.

The polyester plasticizing unit can be made through direct polycondensation of the carboxylic acid unit (anhydride equivalent) and the alcohol unit, either using reduced pressure or a carrier gas to remove the water of reaction. One can either polymerize to high molecular weight directly, or make short chain oligomers and chain extend using a small amount of a chain-extender. If a chain extending agent is used, it may be selected from highly reactive nucleophilic agents, including but not limited to, isocyanates, digycidyl ethers, vinyl ethers or amines and azo compounds, and epoxidized vegetable oils of linseed, soybean, or castrol oil.

Polycondensation is a simple, relatively inexpensive and low-tech means of producing low to medium molecular weight polyesters and polyamides. For the purpose of producing adhesives and adhesive films, sizing, plasticizers and binders this process can be cost effective.

The unsaturated aliphatic anhydride or its equivalent may be selected from, but is not limited to, maleic anhydride, itaconic anhydride, fumaric acid, diacids of unsaturated fatty acids, and mixtures thereof. The saturated aromatic anhydride or its equivalent may be selected from, but is not limited to, phthalic anhydride, terephthalic anhydride, isophthalic anhydride, and mixtures thereof.

Additional anhydrides and equivalent carboxylic acid units may be selected from, but are not limited to, maleic acid, itaconic acid, fumaric acid, dodecanoic diacid, succinic acid, glutaric acid, adipic acid, palmitic acid, suberic acid, azelaic acid, sebacic acid, isophthalic acid, terephthalic acid, hexacloroendomethylene tetrahydrophthalic acid, chlorendic anhydride, tetrahydrophthalic anhydride, hexahydrophthalic anhydride, endomethylene tetrahydrophthalic anhydride, tetrachlorophthalic anhydride, tetrabromophthalic anhydride, chloromaleic acid, citraconic acid, mesaconic acid, and ester derivatives thereof, and mixtures thereof, can be used.

Difunctional alcohols or diols may be selected from the group consisting of, but are not limited to, dianhydro-D-glucitol, 1,2 propanediol, 1,3 propanediol, ethylene glycol, diethylene glycol, triethylene glycol, polyethylene glycol, tetraethylene glycol, polytetrahydrofuran, neopentyl glycol, propylene glycol, dipropylene glycol, dibromoneopentyl glycol, propoxylated bispheno-A, ethoxylated bisphenol A, 2,2, 4-trimethylpentane-1,3-diol, tetrabromobisphenol dipropoxy ether, 1,4-butanediol, 1,3 butanediol, 1,5 pentanediol, 1,6 hexanediol, 1,7heptanediol, octanediol, cyclopentadiol, cyclohexanediol, cyclohexanedimethanol, or their derivatives and mixtures thereof. Difunctional alcohols having a carbon number of 2-10 are presently preferable.

Multifunctional alcohols can be selected from the group consisting of, but are not limited to, glycerin, trimethyl propanol, trimethoxypropane, trimethoxyethane, pentaerythritol, cyclohexanemethanediol, polyester oligomers of pentaerythritol such as Capa 4101, and mixtures thereof.

The plasticizer composition may be blended into polylactic acid with biobased, chemical or mineral nucleating agents. A measure of the effectiveness of a nucleating agent is the crystallization half-time in an isothermal crystallization experiment. For these examples shown in FIG. 1, the polymer samples were directly heated to 250° C., quenched to 115° C. and the crystallization at 115° C. was monitored by DSC. It can be seen that the peak heights of the crystallization peaks corresponding to the growth of the homopolymer crystals (peak B) decreased in the presence of the stereocomplex crystallites (Peak A). Bio-based nucleating agents include natural rubbers as one would find in Havea, or other plants containing latex including gutta-percha (*Palaquium gutta*), rubber fig (*Ficus elastica*), Panama rubber tree (*Castilla elastica*), spurges (*Euphorbia* spp.), lettuce, common dandelion (*Taraxacum officinale*), Russian dandelion (*Taraxacum koksaghyz*), Scorzonera (*tau-saghyz*), and guayule (*Parthenium argentatum*), Chemical nucleating agents include but are not limited to plasticizers such as polybutylene-adipate-terephthalate Mineral and or organic fillers include talc and calcium carbonate, nanocellulose and torrefied biomass (which further improve the heat distortion temperature of polylactic acid over the use of the plasticizer/modifier alone). Table 6 sets forth examples of the plasticizer composition combined with various mineral and or organic fillers with associated properties of flex, strength and toughness. Further examples of bio-based, chemical, mineral or organic nucleating agents are found in Saeidlou et al, Progress in Polymer Science (2010), doi:10.1016/j.progpolymsci.2012.07.005), herein incorporated by reference.

Due to the high price of renewable polymers such as PLA and PHB, there is presently much interest in making polyolefin/biopolymer blends and polyolefin/starch blends to increase the amount of renewable content in packaging. However, polystyrene and polyolefins are non-polar hydrophobic molecules that do not mix easily or well with hydrophilic polar biomolecules like PLA, PHAs, proteins and starch. The end result is an incompatible mixture with poor physical properties such as reduced tensile and yield strength of the parent polyolefin.

The compatibility between biomolecules like starch or PLA with polyolefins can be improved by introducing a coupling agent, reactive compatibilizer or an unreactive compatibilizer. The grafted biopolymer embodiment disclosed herein can be used as a compatibilizing agent for polyolefin/biopolyester blends and polyolefin/starch blends. By attaching the biopolymer compatibilizer disclosed herein onto the backbone of polyolefins such as polypropylene, or polyethylene or polystyrene in a reactive extrusion grafting step, one essentially increases the amount of hydrophilicity in the inherent hydrophobic polyolefin molecule. That means that instead of a blend, an amphipathic hybrid polymer molecule is created capable of homogeneous mixing with the highly polar, hydrophilic biopolyesters such as PLA, PHB, PHB/V, proteins, cellulose or starch. Furthermore, since the biopolymer unit of the copolymer compatibilizer disclosed herein is PLA, PHB or PHB/V, the grafted polyolefin-graft-biopolymer-compatibizer acts as a coupling agent for blends with virgin PLA, or PHB, or PHB/V, which in hand produces more homogeneous blends. Polyolefins, such as polypropylene, polyethylene or polystyrene, become more hydrophilic as they are grafted with the copolymer compatibilizer disclosed herein. As such, they become more receptive to hydrophilic starch and thus the emulsification of starch with the polyolefin is enhanced. The grafted polyolefins also are more receptive to biopolyesters, and the emulsification of biopolyesters with the polyolefins is enhanced. This enhanced emulsification and compatibilization translates into improved physical properties of the blends.

Some useful results may be obtained when the aliphatic anhydride is unsaturated and comprises double bonds that are conserved during the initial polymerization step with the compatibilizing unit, such as the PLA or PHAs. These double bonds are then available for grafting onto aliphatic polyolefins such as polyethylene, polypropylene, polystyrene, and ethylene-octene copolymers.

It is known in the field that maleic anhydride can be grafted onto polyolefins, such as polypropylene, polyethylene and copolymers of ethylene-octene. Lyondell Basel (Rotterdam, The Netherlands), among other polyolefin companies, make and sell these products as emulsifying agents for hydrophilic-hydrophobic blends. K. Premphet, S. Chalearmthitipa in their article Melt Grafting of Maleic Anhydride onto Elastomeric Ethylene-Octene Copolymer by Reactive Extrusion in Polymer Engineering and Science, November, 2001 have shown that it is possible to graft maleic anhydride onto the backbone of ethylene-octene copolymers using extraction extrusion. The grafting of maleic anhydride onto elastomeric ethylene-octene copolymer was performed in a co-rotating twin-screw extruder. Without initiator, some thermal grafting was observed. The degree of grafting was found to increase with the initiator concentration. At the same time, the amount of gel in the sample increased. Although increasing the initial monomer concentration led to a high percentage of grafting and low crosslinking, it resulted in a low degree of conversion. Improving the mixing of the reactants by increasing the screw speed also led to an increase in the percentage of grafting.

The double bonds of the unsaturated monomer unit were not compromised during the polycondensation reaction, as supported with FTIR data. The double bonds in the plasticizing polymer can thus be activated to graft onto polymers that possess a methine proton, such as polypropylene and polystyrene. The initiation of the grafting can be either by peroxide decomposition or by thermo-mechanical radical formation, whereby the radicals abstract hydrogen from the polymer chain. The double bond on the maleic anhydride (MA) monomer may then add to these macromolecules of polypropylene or polystyrene, thus forming a covalent bond between the polypropylene or polystyrene and the plasticizing polymer of the present invention.

Branching has been shown to improve the melt viscosity. Monomers with functionality greater than two can be used for this purpose. The multifunctional monomer can be either the carboxylic acid unit, the alcohol unit, or multifunctional hydroxycarboxylic acids. Specifically, multifunctional components such as maleic acid, tartaric acid, citric acid, trimellitic acid, pyromellitic acid, glycerin, pentaerythritol and trimethylol propane or oligomers of esters made with pentaerythritol such as Capa 4101 may be used. One needs to be careful in selecting the branching agent as well as the concentration used. If the concentration of branching agent is too high, then the resulting polymer may gel. If gels are formed, blending compatibility may be compromised. Films made from incompatible blends tend to have a rough, bumpy appearance, and poor mechanical properties.

Synthesizing the Polyester Plasticizers

The polyesters described herein can be made using techniques well known in the art. The polyesters may be synthesized neat (or in a solvent or cosolvent) using condensation polymerization and transition metal acid catalysts such as organometallic tin at concentrations below about 200 ppm. Water from the reaction may be collected using a column condenser. The reaction is monitored using acid number and viscosity measurements. A number of monomer combinations can be used to make polyesters suitable for the bio-based plasticizer. In one non-limiting embodiment, glycerin and diethylene glycol is reacted neat with maleic anhydride at 150° C. for two hours. 200 ppm of stannous octanoate is added at the beginning of the reaction. After two hours, lactic acid is added and the reaction allowed to continue until the Brookfield viscosity of 255 Poise at 100° C./50 rpms, spindle number 6. This reaction is illustrated in Schematic 1.

Schematic 1: Polymerization of Bio-Based Polyester.

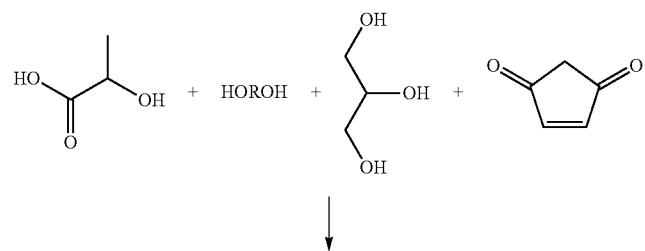

-continued

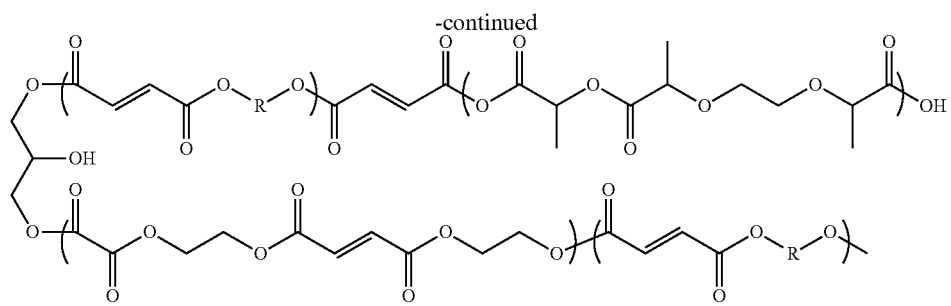

Grafting Polyolefins to the Polyester Plasticizers

Grafting may be conducted in a reactive extruder using standard free radical initiators. In one embodiment, 0.001% of benzyl peroxide is free blended in the prepolymer and then loaded into the extruder. Standard extrusion techniques are employed for this operation. Other suitable free radical initiators include, but are not limited to, potassium persulfate, ammonium persulfate, Benzyl peroxide, di-t-buty peroxide, dicumyl peroxide, lauroyl peroxide, cumene hydroperoxide, p-methane hydroperoxide, a-pinene hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, and the like; and the various alkyl perketals such as 2,2-bis-(t-butylperoxy)butane, ethyl 3,3-bis(t-butylperoxy)butyrate, 1,1-di(t-butylperoxy)cyclohexane, and combinations thereof. One non-limiting example of this reaction, the grafting of polypropylene to the multiunsaturated bio-derived plasticizer that is described herein, is shown below in Schematic 2.

Schematic 2: Grafting of polypropylene to a multiunsaturated bio-derived plasticizer.

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

Example of the synthesis of Lapol 108

41.8 g of glycerin, 154 g of di(ethylene glycol), 200.2 g of maleic anhydride, and 1.62 g of Benefos were charged into a 4-neck reaction vessel equipped with an overhead stirrer, a condenser and collection flask, and a nitrogen purge. The reaction was heated to 100 deg C under a nitrogen blanket. After the maleic anhydride briquettes melted and dissolved in glycerine and di(ethylene glycol) solution, 1.42 g of stannous octoate was added dropwise. The reaction was heated to 165 deg C and left to react until the acid number dropped to a range between 80 and 90. Then, 410 g of an 88% lactic acid solution were added to the reaction mixture along with 1.62 g of Benefos 1680. The reaction was allowed to continue at 165 deg C until the acid number dropped in the range between 70 and 80. The reaction temperature was increase to 200 deg C and maintained at that temperature until the acid number

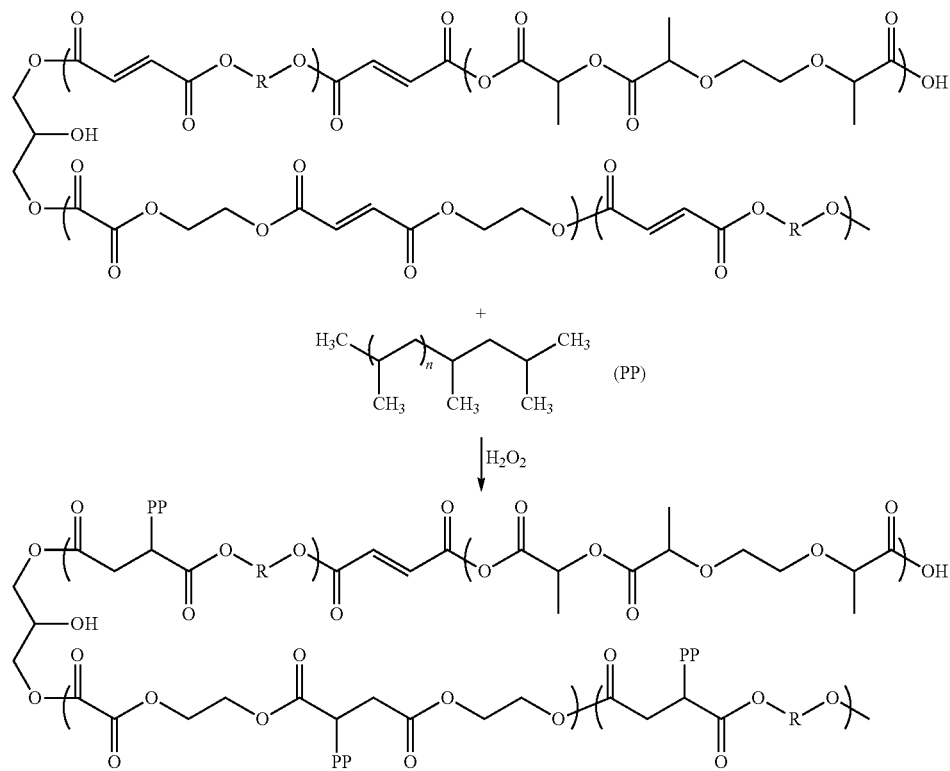

dropped in the range between 40 to 60 and a viscosity measurement of 250 Poise (at 50 rpm and 100 deg C, Spindle 6 Brookfield viscometer) was obtained. 37.8 g of phthalic anhydride was then added slowly. The reaction products were then poured out and analyzed.

Example of the Synthesis of Lapol HDT (2 Steps)

Synthesis of Lapol HDT Prepolymer 83.6 g of glycerine, 308.0 g of di(ethylene glycol), 400.4 g of maleic anhydride briquettes, and 3.24 g of Benefos 1680 were charged into a 4 neck reaction vessel with an overhead stirrer, a condenser and collection flask, and a nitrogen purge. The reaction was heated to 100 deg C under a nitrogen blanket. After the maleic anhydride briquettes melted and dissolved in the glycerin and di(ethylene glycol) solution, 2.84 g of stannous octoate was added dropwise. The reaction was heated to 165 deg C and left to react until the acid number dropped to a range between 80 and 90. The reaction products were poured out. Weight-average molecular weight of the prepolymer was in the range of 1000 to 2000 Daltons.

Synthesis of Lapol HDT 10, Mw's 13,000, 70,000, and 100,000

D-lactide was charged into a glass kettle resin and was heated to 100 deg C. Once the lactide melted, 1,4-butanediol was added followed by stannous octoate. The reaction was heated to 180 deg C under a nitrogen blanket and allowed to react for 2 hours. Then, an appropriate amount of Lapol HDT Prepolymer was added to obtain a copolymer that is comprised of 90% by weight D-PLA and 10% by weight Lapol HDT Prepolymer. After an hour, the reaction products were poured out. 3 different copolymers were obtained with Mw's 13,000, 70,000, and 100,000 Daltons. DSC data is tabulated in Table 1.

TABLE 1

DSC data of 3 Lapol HDT 10 copolymers.

| $M_w$ | $T_g$ | $T_m$ | H of $T_m$ |
|---|---|---|---|
| 13,000 | 56 | 164 | 53 |
| 70,000 | 52 | 176 | 45 |
| 100,000 | 62 | 175 | 17 |

Preparation of 80/20 Blends

L-PLA and various Lapol HDT 10 formulations were blended at a 80/20 ratio using a Leistritz twin-screw extruder. The L-PLA and Lapol HDT 10 grannules were dried at 85 deg C overnight. The L-PLA and Lapol HDT 10 grannules were dry mixed and then metered slowly into the feed port of the extruder. The temperature profile setting of the extruder was as follows:

| Wt % L-PLA | Wt % Lapol HDT 10 | Lapol HDT 10 Mw | HZ1 | HZ2 | HZ3 | HZ4 | HZ5 | HZ6 |
|---|---|---|---|---|---|---|---|---|
| 100 | x | X | 160 | 180 | 200 | 200 | 200 | 200 |
| 80 | 20 | 13,000 | 165 | 200 | 215 | 215 | 206 | 205 |
| 80 | 20 | 70,000 | 165 | 200 | 215 | 215 | 206 | 205 |
| 80 | 20 | 100,000 | 165 | 200 | 215 | 215 | 206 | 205 |

The extruded strands were air cooled on a conveyer belt and then pelletised. The pellets were conditioned at ambient temperature prior to injection moulding.

The DSC data for the 80/20 (wt/wt) blends is shown in Table 2.

TABLE 2

DSC data for 80/20 (wt/wt) PLA/Lapol HDT 10 blends.

| Wt % L-PLA | Wt % Lapol HDT 10 | $M_w$ Lapol HDT 10 | $T_g$ | $T_m 1$ | H of $T_m 1$ | $T_m 2$ | H of $T_m 2$ |
|---|---|---|---|---|---|---|---|
| 100 | x | X | 64 | 180 | 28 | x | x |
| 80 | 20 | 13,000 | 56 | 172 | 11 | 229 | 45 |
| 80 | 20 | 70,000 | 63 | 177 | 15 | 230 | 25 |
| 80 | 20 | 100,000 | 56 | 178 | 14 | 229 | 25 |

Injection Molding of Plates

4"×2" injection moulded plates were prepared using a BOY-injection moulded machine. The blends were melted at 195 deg C and then injected into a cavity mold set at 72 deg C. TMA results are tabulated in Table 3.

TABLE 3

TMA data of the blends (non crystalline).

| Wt % L-PLA | Wt % Lapol HDT 10 | $M_w$ Lapol HDT 10 | TMA |
|---|---|---|---|
| 100 | X | x | 63 |
| 80 | 20 | 13,000 | 164 |
| 80 | 20 | 70,000 | 60 |
| 80 | 20 | 100,000 | 59 |

Glass Transition Temperature Tg

Glass Transition Temperature Tg and the lack of a Melting Enthalpy ΔHm were measured with a TA Instruments Differential Scanner calorimeter provided with a liquid nitrogen cooling system. The instrument was calibrated with a high purity standard (indium). About 10 mg of polymer were placed in an aluminum capsule and cooled to −100° C. The temperature was held for 30 minutes and then heated at a rate of 10° C./min. A second heating was conducted by first heating to 80° C. and holding this temperature for 30 minutes. The sample was then re-cooled to −100° C. and ramping back up to 180° C. at a rate of 10° C./min (2 scanning). Tg was obtained from the thermogram of the second scanning, in order to have a uniform thermal history of the samples. No melting temperature was seen on the DSC curves for any of the samples.

GPC—Molecular Weight

Gel permeation chromatography was run on a Waters 2414 Refractive Index Detector with 2 columns: Styragel HR 4E THF and HR 1 THF, both 7.8×300 mm Detection used Waters 2414 Differential Refractometer with temperature control. A flow rate of 1 mL/min is used with an injection of 100 pL of a 0.05% solution in chloroform. Polystyrene standards are used as controls. Optimal molecular weight was between 1,000 and 200,000 g/mol with a molecular weight distribution greater than 4.

TGA—Degradation Onset

Thermogravimetric analysis was conducted using a TA Instruments Hi-Res TGA 2950 Thermogravimetric Analyzer. A 20 mg sample was prepared and was placed onto the TGA sample pan. The sample was then heated to 500° C. at a rate of 10° C./minute. Optimal degradation temperatures were greater than 250° C.

Viscosity—Branching and Molecular Weight

Viscosity was measured using a TA Instruments Advanced Rheometer 2000. About a 500 mg sample was placed the flat bottom plate that is heated to 100° C. A rotating disc is lowered onto the sample and allowed to spin at 750 rpms on the sample at temperature. The instrument is internally calibrated and displays a reading after about 30 seconds. The reading is measured in Poise and recorded for temperature and rpms. The preferred viscosity is between 200 and 900 Poise when measured using a Brookfield viscometer at 100 C and 50 rpm, spindle #6.

Polymer Blends

Blends were made using a Haake melt mixer (Rheomix 600) with a Rheomix 9000 controller. PLA from NatureWorks with a weight average molecular weight of 100,000 g/mole was dried overnight in a 70° C. oven with Drierite used as a moisture absorber. 10, 20 and 30% samples of the plasticizer invention were weighed on a milligram analytical balance as was the predried PLA. PLA was transferred into a preheated 180° C. Haake mixing bowl using sigma blades rotating at 70 rpms. After the PLA is melted, the plasticizer invention was transferred into the mixing bowl and allowed to blend for about 7 minutes. The blend was then collected and pressed into thin films for tensile testing. The resulting 10% blends were optically clear.

Film Preparation and Tensile Testing

Films were pressed using a Carver press operated using a computer interface. 20 grams of polymer blend were placed between two pieces of Mylar film sitting on two 12"×12" aluminum plates with 0.60 mm wedges. The polymer was sandwiched between the Mylar and the aluminum and placed on the bottom platen of the Carver press. The platens were closed to just touching to allow the polymer to melt without pressure for two minutes. After two minutes, the press was allowed to close under 2000 psi pressure for 30 minutes. The press was then opened and the plates removed and allowed to cool to room temperature. The polymer films were then removed and cut into tensile bars. The general thickness of the films was nominally 0.55 mm.

Tensile testing was conducted according to ASTM Standard D638. The samples were allowed to equilibrate at 23° C. for 40 hours at 50% humidity. Type V test specimens were used with a nominal thickness of 0.55 mm. The samples were then pulled at a rate of 5.0 mm/min until broken. At least five samples were tested and the number reported is an average.

TABLE 4

Physical properties of plasticizing unit of the copolymer plasticizer composition with 60 mole % L-lactic acid

| Sample No. | Viscosity 100° C. @ 750 rpm (Poise) | Onset Tg (° C.) | Tg (° C.) | Mn | Mw | PD | Onset Degradation Temp (° C.) | Peak Degradation Temp (° C.) |
|---|---|---|---|---|---|---|---|---|
| AF011508 | 74 | −5.49 | 1.35 | 11,000 | 11,000 | 1.01 | 292 | 357 |
| LT020108 | 382 | −4.79 | 2.22 | 15,000 | 16,000 | 1.10 | 319 | 389 |
| LT020708 | 64 | −7.53 | 0.62 | 15,000 | 16,000 | 1.11 | 290 | 341 |
| LT021908 | 246 | 5.44 | 14.56 | 11,000 | 11,000 | 1.01 | 303 | 347 |
| LT022808A | 600 | −21.78/3.80 | −13.34/9.13 | 24,000 | 39,000 | 1.62 | 287 | 354 |
| LT030308 | 253 | 1.08 | 8.81 | 16,000 | 20,000 | 1.20 | No data | No data |
| LT030508A | 553 | −19.88/1.96 | −14.83/5.95 | 24,000 | 39,000 | 1.63 | No data | No data |
| LT031208 | 581 | −17.96/3.91 | −14.27/8.83 | | | | 260 | 337 |
| Lapol 108 | 581 | −10.00 | −5.00 | 2,300 | 90,000 | 45 | 295 | 337 |

TABLE 5

Physical properties of Polylactic acid blends with 10% plasticizer

| Sample No. | Modulus (MPa) | Elongation @ Break (%) | Tensile @ Peak (MPa) |
|---|---|---|---|
| PLA | 1600 | 8 | 57 |
| Ecoflex ® | 1081 | 247 | 32 |
| Hallgreen ® R-4010 | 1200 | 12 | 37 |
| AF011508 | 1200 | 220 | 39 |
| LT031208 | 1600 | 165 | 41 |
| LT020108 | 1600 | 200 | 46 |
| LT022808A | 1769 | 70 | 37 |
| LT030508A | 1900 | 40 | 60 |
| LT030308 | 1224 | 83 | 42 |
| Lapol 108 | 1600 | 200 | 57 |

Samples identified in Tables 5 refer to 10% blends of the bioderived plasticizer described in this disclosure in polylactic acid referred to as PLA. Ecoflex and Hallgreen R-4010 are commercially available plasticizers.

TABLE 6

Lapol HDT properties with various additives.

| Wt % LAPOL HDT | Wt % ADDITIVE | Wt % PLA 3001D | FLEX STRENGTH (MPa) | FLEX MODULUS (MPa) | TOUGHNESS (MPa) | HEAT DEFLECTION TEMP |
|---|---|---|---|---|---|---|
| Control | | | | | | |
| 0 | 0 | 100% | 133 | 4000 | 0.865 | 61° C. (−3250 mm) |
| Lapol HDT in NatureWorks 3001D | | | | | | |
| 20% HDT 10 (20K) | 0 | 80% | 61 | 3500 | 0.032 | 55° C. (−250 mm), 159° C. (−3250 mm) |
| 20% HDT 20 (20K) | 0 | 80% | 81 | 3500 | 0.121 | 55° C. (−250 mm), 159° C. (−3250 mm) |
| 20% HDT 10 (100K) | 0 | 80% | 93 | 2603 | 0.237 | 56° C. (−500 mm), 160° C. (−3250 mm) |
| Lapol HDT in NatureWorks 3001D with Plasticizers - Rubber | | | | | | |
| 20% HDT 10 (20K) | 10% Natural Rubber Type A | 70% | 20 | 1343 | 0.028 | 56° C. (−250 mm), 166° C. (−3250 mm) |
| 20% HDT 10 (100K) | 10% Natural Rubber Type A | 70% | 57 | 2098 | 0.128 | 58° C. (−500 mm), 178° C. (−3250 mm) |
| 20% HDT 10 (20K) | 10% Natural Rubber Type B | 70% | 21 | 2208 | 0.013 | 57° C. (−500 mm), 165° C. (−3250 mm) |
| 20% HDT 10 (100K) | 10% Natural Rubber Type B | 70% | 40 | 2394 | 0.044 | 52° C. (−250 mm), 166° C. (−3250 mm) |
| Lapol HDT in NatureWorks 3001D with Plasticizers - Rubber | | | | | | |
| 20% HDT 10 (100K) | 10% Lapol 108 | 70% | 54 | 3155 | 0.061 | 49° C. (−250 mm), 165° C. (−3250 mm) |
| Lapol HDT in NatureWorks 3001D with Plasticizers - Ecoflex | | | | | | |
| 20% HDT 10 (20K) | 10% Ecoflex | 70% | 75 | 2916 | 0.120 | 66° C. (−750 mm), 166° C. (−3250 mm) |
| 20% HDT 10 (100K) | 10% Ecoflex | 70% | 104 | 2936 | 0.311 | 56° C. (−1000 mm), 175° C. (−3250 mm) |
| Lapol HDT in NatureWorks 3001D with Fillers - Torrefied Biomass | | | | | | |
| 20% HDT 10 (20K) | 15% Torrefied Biomass | 65% | 49 | 3563 | 0.060 | 54° C. (−400 mm), 158° C. (−900 mm) |
| 20% HDT 10 (20K) | 20% Torrefied Biomass | 60% | 40 | 3804 | 0.040 | 54° C. (−200 mm), 158° C. (−900 mm) |
| 20% HDT 10 (20K) | 30% Torrefied Biomass | 50% | 0 | 0 | 0 | 165° C. (−3250 mm) |
| Lapol HDT in NatureWorks 3001D with Inorganic Fillers | | | | | | |
| 20% HDT 10 (20K) | 10% Ultratalc | 70% | 47 | 3465 | 0.038 | 80° C. (−100 mm), 168° C. (−3250 mm) |
| 20% HDT 10 (20K) | 10% EMForcebio | 70% | 72 | 5760 | 0.052 | 54° C. (−250 mm), 158° C. (−3250 mm) |

Also included in these tables are PLA alone and with other polyester controls. The controls are 20% blends of Ecoflex® in PLA and Hallgreen® polyester plasticizers in PLA. PLA is manufactured by NatureWorks® and is available through Jamplast, Inc., Ellisville, Mo. Hallgreen R-4010 is a bio-derived ester plasticizer manufactured by Hallstar Company, Chicago Ill. Ecoflex is a biodegradable polymer used as a plasticizer with PLA made by BASF, Germany. It will be appreciated that the disclosed bioderived plasticizers may improve the flexibility of biopolymers without adversely affecting the Young's Modulus.

It will further be appreciated that the disclosed bioderived plasticizers may be blended with biopolymers as well as petrochemically derived polyolefins to produce polymeric products having excellent toughness and flexibility at low plasticizer concentrations without sacrificing physical properties such as the Young's Modulus.

It will be appreciated that disclosed bioderived plasticizers may be blended with PLA or polyolefins that show outstanding resistance to bleeding out at high temperature.

It will be appreciated that the disclosed bioderived plasticizers show improved miscibility with base biopolymers and have improved optical clarity.

While specific embodiments of the present invention have been illustrated and described, numerous modifications come to mind without significantly departing from the spirit of the invention, and the scope of protection is only limited by the scope of the accompanying claims.

The invention claimed is:

1. A copolymer plasticizer composition comprising:
a) a compatibilizing unit consisting of:
a lower alkyl organic acid or derivatives of a lower alkyl organic acid and b) a polyester plasticizing unit formed from monomers consisting of:
a multifunctional alcohol;
an aliphatic anhydride or its equivalent;
and a saturated aromatic anhydride or its equivalent,
wherein the weight ratio (wt/wt) of the compatibilizing unit to the plasticizing unit is in the range from 90:10 (wt/wt) to 60:40 (wt/wt) and the copolymer plasticizer has a glass transition temperature from more than 30° C. to 70° C.

2. The compatibilizing unit of the copolymer plasticizer composition according to claim 1, wherein the lower alkyl organic acid comprises a C3 to C7 alkyl backbone.

3. The compatibilizing unit of the copolymer plasticizer composition according to claim 1, wherein the organic acid is selected from lactic acid, butyric, valeric, and caprolactic acid, diphenolic acid, levulinic acid.

4. The compatibilizing unit of the copolymer plasticizer composition according to claim 1, wherein the lower alkyl organic acid comprises a hydroxyl moiety.

5. The compatibilizing unit of the copolymer plasticizer composition according to claim 1, wherein the lower alkyl organic acid comprises a cyclic, dimeric derivative consisting of D- or L-lactide.

6. The copolymer plasticizer composition according to claim 1, wherein the plasticizing unit further comprises one or more difunctional alcohols.

7. The plasticizing copolymer plasticizer composition according to claim 1, wherein the difunctional alcohol has a carbon number in the range from 2 to 10.

8. The plasticizing unit of the copolymer plasticizer composition according to claim 1, wherein molar ratio of difunctional alcohols to multifunctional alcohols is from 5:95 to 95:5.

9. The plasticizing unit of the copolymer plasticizer composition according to claim 1, wherein molar ratio of difunctional alcohols to multifunctional alcohols is preferably from 40:60 to 60:40.

10. The plasticizing unit of the copolymer plasticizer composition according to claim 1, wherein the difunctional alcohol is selected from dianhydro-D-glucitol, 1,2 propanediol, 1,3 propanediol, ethylene glycol, diethylene glycol, triethylene glycol, neopentyl glycol, dipropylene glycol, dibromoneopentyl glycol, propoxylated bisphenol-A, ethoxylated bisphenol A, 2,2,4-trimethylpentane-1,3-diol, tetrabromobisphenol dipropoxy ether, 1,4-butanediol, 1,3-butanediol, hexanediol, 1,6 hexanediol, octanediol, cyclopentadiol, cyclohexanediol, cyclohexanedimethanol, and derivatives and mixtures thereof.

11. The plasticizing unit of the copolymer plasticizer composition according to claim 1, wherein the multifunctional alcohol is selected from glycerin, trimethyl propanol, trimethoxypropane, trimethoxyethane, pentaerythritol, cyclohexanemethanediol, polyester oligomers of pentaerythritol, and mixtures thereof.

12. The copolymer plasticizer composition according to claim 1, wherein the plasticizing unit has a molar ratio of the aliphatic anhydride or its equivalent to the aromatic anhydride or its equivalent in the range from 99:1 to 1:99.

13. The copolymer plasticizer composition according to claim 1, wherein the copolymer plasticizer composition is amorphous or semicrystalline.

14. The plasticizing unit of the copolymer plasticizer composition according to claim 1, wherein the aliphatic anhydride or its equivalent is selected from maleic anhydride, itaconic anhydride, fumaric acid, and diacids of unsaturated fatty acids.

15. The plasticizing unit of the copolymer plasticizer composition according to claim 1, wherein the saturated aromatic anhydride or its equivalent is selected from is selected from phthalic anhydride, terephthalic acid, isophthalic acid, and diphenolic acid.

16. The plasticizing unit of the copolymer plasticizer composition according to claim 1, wherein the copolymer plasticizer has a weight average molecular weight between 1000 and 200,000 g/mol.

17. The copolymer plasticizer composition according to claim 1, blended with polylactic acid, wherein the blend has an increased elongation at break by at least 25% without a decrease in Young's modulus compared to the unblended polylactic acid.

18. The copolymer plasticizer composition according to claim 1, wherein the polyester plasticizing unit is formed from monomers further comprising a chain extending monomer.

19. A copolymer additive comprising:
a compatibilizing unit comprising a lower alkyl organic hydroxy acid or its cyclic, dimeric derivatives having a carbon number in the range from 3 to 7;
and a polyester plasticizing unit formed from monomers comprising:
a multifunctional alcohol; a difunctional alcohol having a carbon number in the range from 2 to 10, wherein molar ratio of difunctional alcohols to multifunctional alcohols is from 5:95 to 95:5;
an aliphatic anhydride or its equivalent; and
a saturated aromatic anhydride or its equivalent;
wherein the plasticizing unit has a molar ratio of the aliphatic anhydride or its equivalent to the aromatic anhydride or its equivalent in the range from 99:1 to 1:99;
wherein the weight ratio (wt/wt) of the compatibilizing unit to the plasticizing unit is in the range from 99:1 (wt/wt) to 60:40 (wt/wt), wherein the copolymer plasticizer composition has a weight average molecular weight between 1000 and 200,000 g/tool, and wherein the copolymer plasticizer composition has a glass transition temperature between more than 30° C. to 70° C.

20. The plasticizer unit of the copolymer plasticizer composition according to claim 19, wherein the difunctional alcohol is selected from 1,2 propanediol, 1,3 propanediol, ethylene glycol, diethylene glycol, triethylene glycol, polyethylene glycol, tetraethylene glycol, polytetrahydrofuran, neopentyl glycol, propylene glycol, dipropylene glycol, dibromoneopentyl glycol, propoxylated bisphenol-A, ethoxylated bisphenol A, 2,2,4-trimethylpentane-1,3-diol, tetrabromobisphenol dipropoxy ether, 1,4-butanediol, 1,3 butanediol, 1,5 pentanediol, 1,6 hexanediol, 1,7 heptanediol, octanediol, cyclopentadiol, cyclohexanediol, cyclohexanedimethanol, or their derivatives and mixtures thereof.

21. The plasticizer unit of the copolymer plasticizer composition according to claim 19, wherein the multifunctional alcohol is selected from glycerin, trimethyl propanol, trimethoxypropane, trimethoxyethane, pentaerythritol, cyclohexanemethanediol, polyester oligomers of pentaerythritol, oligomeric polyesters of caprolactone, poly THF, and mixtures thereof.

22. The plasticizing unit of the copolymer plasticizer composition according to claim 19, wherein the aliphatic anhydride or its equivalent is selected from maleic anhydride, itaconic anhydride, fumaric acid, and diacids of unsaturated fatty acids.

23. The plasticizing unit of the copolymer plasticizer composition according to claim 19, wherein the saturated aromatic anhydride or its equivalent is selected from phthalic anhydride, terephthalic acid, isophthalic acid, and diphenolic acid.

24. A copolymer plasticizer composition comprising:
a compatibilizing unit selected from lactic acid, butyric, caprolactone, levulinic acid, valeric acid, and derivatives of these hydroxy acids; and
a polyester plasticizing unit formed from monomers comprising:

a multifunctional alcohol selected from glycerin, trimethyl propanol, pentaerythritol, cyclohexanemethanediol, polyester oligomers of pentaerythritol, and mixtures thereof;

an aliphatic anhydride or its equivalent selected from, maleic anhydride, itaconic anhydride, fumaric acid, and diacids of unsaturated fatty acids, mixtures and equivalents thereof; and a saturated aromatic anhydride or its equivalent selected from phthalic anhydride, terephthalic acid, and isophthalic acid, mixtures and equivalents thereof;

wherein the weight ratio (w/wt) of the compatibilizing unit to the plasticizing unit is in the range from 99:1 (wt/wt) to 60:40 (wt/wt).

25. The copolymer plasticizer composition according to claim 24, wherein the plasticizing unit further comprises one or more difunctional alcohols having a carbon number in the range from 2 to 10.

26. The plasticizing unit of the copolymer plasticizer according to claim 24, wherein molar ratio of difunctional alcohols to multifunctional alcohols is from 95:5 to 5:95.

27. The copolymer plasticizer composition according to claim 24, wherein the difunctional alcohol is selected from 1,2 propanediol, 1,3 propanediol, ethylene glycol, diethylene glycol, triethylene glycol, polyethylene glycol, tetraethylene glycol, polytetrahydrofuran, neopentyl glycol, propylene glycol, dipropylene glycol, dibromoneopentyl glycol, propoxylated bisphenol-A, ethoxylated bisphenol A, 2,2,4-trimethylpentane-1,3-diol, tetrabromobisphenol dipropoxy ether, 1,4-butanediol, 1,3 butanediol, 1,5 pentanediol, 1,6 hexanediol, 1,7 heptanediol, octanediol, cyclopentadiol, cyclohexanediol, cyclohexanedimethanol, or their derivatives and mixtures thereof.

28. The copolymer plasticizer composition according to claim 1, wherein the copolymer plasticizer composition is grafted to the backbone of polyolefins using an unsaturated functionality of the copolymer plasticizer.

29. The copolymer plasticizer composition according to claim 1, wherein the copolymer plasticizer composition is a compatibilizer or an emulsifier for polyolefin/biopolyester blends.

30. The copolymer plasticizer composition according to claim 1, wherein the copolymer plasticizer composition is a compatibilizer or an emulsifier for polyolefin/starch blends.

* * * * *